United States Patent [19]

Rainis

[11] Patent Number: 5,328,595
[45] Date of Patent: Jul. 12, 1994

[54] REFORMING NAPHTHA WITH LARGE-PORE ZEOLITES

[75] Inventor: Andrew Rainis, Walnut Creek, Calif.

[73] Assignee: Chevron Research and Technology Company, San Francisco, Calif.

[21] Appl. No.: 970,975

[22] Filed: Nov. 2, 1992

Related U.S. Application Data

[63] Continuation of Ser. No. 645,939, Jan. 25, 1991, abandoned.

[51] Int. Cl.⁵ .............................................. C10G 35/06
[52] U.S. Cl. .................................... 208/138; 208/135; 208/136; 208/137
[58] Field of Search ................ 208/135, 138, 136, 137

[56] References Cited

U.S. PATENT DOCUMENTS 4,927,525  5/1990  Chu ..................................... 208/138

Primary Examiner—Helane Myers
Attorney, Agent, or Firm—J. A. Scholten; V. J. Cavalieri; W. K. Turner

[57] ABSTRACT

Catalytic reforming of a naphtha feed with large-pore zeolites containing Group VIII metals and Group IA or Group IIA metal cations.

26 Claims, 1 Drawing Sheet

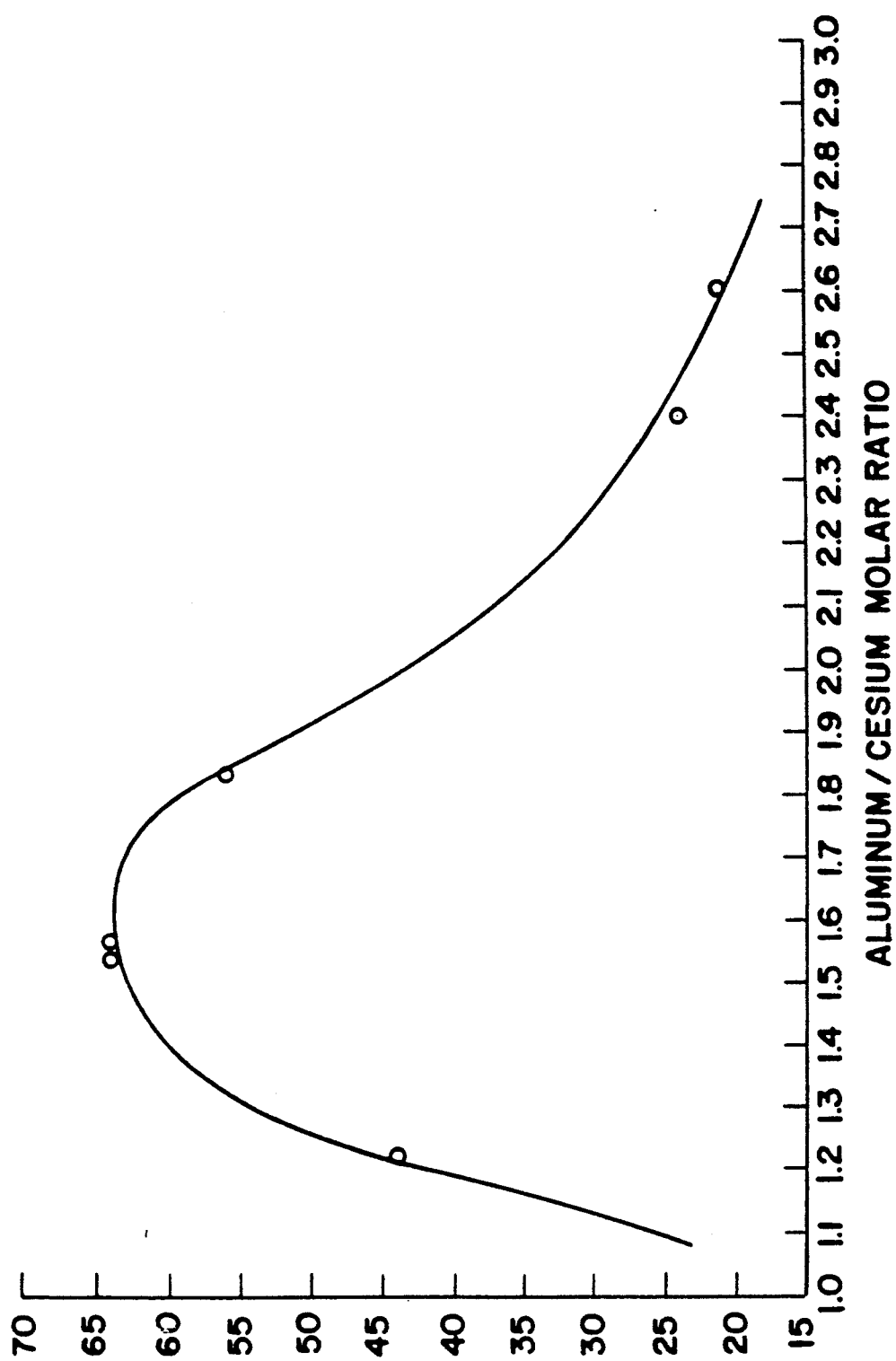
FIG_1

REFORMING NAPHTHA WITH LARGE-PORE ZEOLITES

This is a continuation of application Ser. No. 645,939, filed Jan. 25, 1991, now abandoned.

BACKGROUND OF THE INVENTION

This invention relates to a catalytic reforming process using zeolite catalysts. Catalytic reforming is a process for treating naphtha fractions of petroleum distillates to improve their octane rating by producing aromatic components and isomerizing normal paraffins to isoparaffins from components present in naphtha feedstocks. Included among the hydrocarbon reactions occurring in reforming processes are: dehydrogenation of naphthenes to aromatics, dehydrocyclization of paraffins to aromatics, and hydrocracking of paraffins to lighter gases with a lower boiling point than gasoline. Hydrocracking reactions which produce light paraffin gases are not desirable as they reduce the yield of products in the gasoline boiling range.

Natural and synthetic zeolitic crystalline aluminosilicates containing Group VIII metals and Groups IA and IIA metal cations exhibit catalytic properties for various types of hydrocarbon conversions including catalytic reforming.

U.S. Pat. No. 4,789,656 issued to Chen et al. discloses a process for synthesizing Beta Zeolite catalyst. A noble metal component is incorporated into the beta zeolite catalyst. Noble metals which are incorporated within the zeolite include metals of Groups IB, IIB, VA, VIA or VIIIA.

U.S. Pat. No. 4,652,360 issued to Dessau discloses a reforming process using ZSM-5 and ZSM-11 zeolite catalysts having a silica to alumina ratio of at least 12 containing a Group VIII metal. The zeolite is base exchanged with Group IA metal cations.

U.S. Pat. No. 4,835,336 issued to McCullen discloses a process for converting a $C_6$-$C_{12}$ paraffinic hydrocarbon feed to aromatics with a noble metal, low activity medium pore size zeolite catalyst including a beta zeolite catalyst.

U.S. Pat. No. 4,867,864 issued to Dessau discloses a reforming process using a non-acidic beta zeolite catalyst composition containing a Group VIII metal. The acidity of the catalyst is reduced by treating it with a solution containing Group IA or Group IIA metal cations.

U.S. Pat. No. 4,927,525 issued to Chu discloses catalytic reforming processes with improved zeolite catalysts. This reference discloses the use of beta zeolite in reforming processes. The beta zeolite described in this reference contains a noble metal and an alkali metal. The noble metal is selected from the group consisting of platinum, iridium, osmium, palladium, rhodium and ruthenium. The alkali metal is selected from the group consisting of lithium, sodium, potassium and rubidium. The effect of alkali metal loading on catalytic activity is shown in Examples 7-11 of U.S. Pat. No. 4,927,525. These examples show that certain zeolitic catalysts which have a $Li^+:AlO_2^-$ ratio of less than 1 are inferior to zeolitic catalysts which have $Li^+:AlO_2^-$ ratios greater than 1. Therefore, this reference teaches that by lowering the ratio of $AlO_2:Li$ to less than 1, the catalytic reforming properties of these materials are improved.

I have found that the catalytic reforming properties of the beta zeolite catalyst and other large-pore zeolites are significantly improved when the molar ratio of aluminum to Group IA or Group IIA metal cations is between about 1.0 and 4.0. These properties include high catalyst stability at low pressure, high catalyst activity, and lower methane and ethane production.

SUMMARY OF THE INVENTION

According to the present invention, a process is provided for catalytic reforming of a hydrocarbon feedstock. This catalytic reforming process comprises contacting a hydrocarbonaceous feedstock under catalytic reforming conditions with a composition comprising a large-pore zeolite having a pore size greater than 6 and less than 8 angstroms, a Group VIII metal component, and a Group IA or Group IIA metal cation wherein the molar ratio of aluminum to Group IA or Group IIA metal cations is between about 1.0 and 4.0. Preferably, the large-pore zeolites are SSZ-26, mordenite, ZSM-12, SSZ-33, SSZ-24, beta zeolite, and SSZ-31. Most preferably, beta zeolite is used in the catalytic reforming process.

Among other factors, the present invention is based on our finding that large-pore zeolites containing a Group VIII metal component and having a molar ratio of aluminum to a Group IA or Group IIA metal cation between about 1.0 and 4.0 have unexpectedly outstanding reforming properties. These include high catalyst stability at low pressure, high catalyst activity, and lower methane and ethane production.

BRIEF DESCRIPTION OF THE DRAWINGS

FIG. 1 shows the range of cesium loading on platinum beta zeolites which give the good aromatization selectivity under the reforming conditions and with the feed properties of Example 4. The optimal range of cesium loading on platinum beta zeolites will vary depending on the feed properties.

DETAILED DESCRIPTION OF THE INVENTION

The large-pore zeolites have a pore size greater than 6 and less than 8 angstroms. A method of determining this pore size is described in *Journal of Catalysis* (1986); Vol. 99, p. 335 (D. S. Santilli). A large-pore zeolite may be identified by using the pore probe technique described in *Journal of Catalysis* (1986); Vol. 99, p. 335 (D. S. Santilli). This method allows measurement of the steady-state concentrations of compounds within the pores of materials. 2,2-dimethylbutane (22DMB) enters the large pores and the concentration in the pores is measured using this technique.

The large-pore zeolites which are preferred are SSZ-26, mordenite, ZSM-12, SSZ-33, SSZ-24, beta zeolite and SSZ-31. Most preferred is beta zeolite.

The large-pore zeolites can contain various framework elements other than, or in addition to, aluminum and can be modified to alter their as-synthesized framework silica-alumina ratios.

SSZ-26 is described in U.S. Pat. No. 4,910,006, the disclosure of which is incorporated herein by reference.

SSZ-33 is described in U.S. Pat. No. 4,963,337, the disclosure of which is incorporated herein by reference.

SSZ-24 is described in U.S. Pat. No. 4,834,958, the disclosure of which is incorporated herein by reference.

SSZ-31 is described in our co-pending application Ser.

No. 471,158 entitled "New Zeolite SSZ-31", the disclosure of which is incorporated herein by reference.

ZSM-12 is described in U.S. Pat. No. 3,832,449, the disclosure of which is incorporated herein by reference.

Beta zeolite is described in U.S. Pat. No. 3,308,069, the disclosure of which is incorporated herein by reference.

The large-pore zeolite catalyst contains a Group VIII metal component to have sufficient activity for commercial use. By Group VIII metal component as used herein is meant the metal itself or a compound thereof. Preferred embodiments are the Group VIII noble metals and their compounds, platinum, palladium, and iridium, or combinations thereof can be used. The most preferred metal is platinum. The amount of Group VIII metal present in the conversion catalyst should be within the normal range of use in reforming catalysts, from about 0.1 to 2.0 wt. percent, preferably 0.3 to 1.0 wt. percent. In addition, the catalyst can also contain a Group VII metal or compound thereof. Especially preferred is rhenium.

The zeolite/Group VIII metal catalyst can be used with or without a binder or matrix. The preferred inorganic matrix, where one is used, is a silica-based binder such as Cab-O-Sil or Ludox. Other matrices such as alumina, magnesia and titania can be used. The preferred inorganic matrix is nonacidic.

It is critical to the selective production of aromatics in useful quantities that the conversion catalyst be partially free of acidity, for example, by exchanging the sites in the zeolite with metal ions, e.g., Group IA and Group IIA ions.

The zeolite is usually prepared from mixtures containing alkali metal hydroxides and, thus, have alkali metal contents of about 1-2 wt. percent. These high levels of alkali metal, usually sodium or potassium, are unacceptable for most other catalytic applications because they deactivate the catalyst for cracking reactions by reducing catalyst acidity. Therefore, the alkali metal is removed to low levels by ion exchange with hydrogen or ammonium ions. By alkali metals as used herein is meant ionic alkali metals or their basic compounds. Surprisingly, unless the zeolite itself is partially free of acidity, the alkali metal is required in the present process to reduce acidity and improve aromatics production. Alkali metals are incorporated by impregnation or ion exchange using nitrate, chloride, hydroxide or carbonate salts.

The amount of Group IA or Group IIA metal cations necessary to decrease the acidity of the large-pore zeolite can be calculated using standard techniques based on the aluminum, gallium or iron content of the zeolites. If a large-pore zeolite free of alkali metal is the starting material, alkali metal ions can be ion-exchanged into the zeolite to partially reduce the acidity of the zeolite.

I have found that by incorporating Group IA or Group IIA metal cations into a large-pore zeolite containing a Group VIII metal, such that the molar ratio of aluminum to the Group IA or Group IIA metal cation is between about 1.0 and 4.0, the acidity of the zeolite is partially reduced and a superior reforming catalyst was obtained with partially reducing acidity.

The preferred Group IA metals are cesium, lithium, potassium and sodium. The preferred Group IIA metals are barium, calcium, magnesium and strontium.

Most preferably, the catalyst used in the reforming process comprises a large-pore zeolite containing platinum and cesium and having a molar ratio of aluminum to cesium between about 1.0 and 4.0.

Therefore, contrary to the disclosure in U.S. Pat. No. 4,927,525, I have found that the catalytic reforming properties of large-pore zeolites are significantly improved when the molar ratio of aluminum to Group IA or Group IIA metal cations is between about 1.0 and 4.0. These properties include high catalyst stability at low pressure, high catalyst activity, and lower methane and ethane production as further discussed below.

The large-pore zeolites can be used as reforming catalysts to convert light straight run naphthas and similar mixtures to highly aromatic products. Thus, normal and slightly branched hydrocarbons, preferably having a boiling range above about 40° C. and less than about 250° C., can be converted to products having a substantial aromatics content by contacting the hydrocarbon feed with the zeolite at a temperature in the range of from about 350° C. to 600° C., at pressures ranging from atmospheric to 20 atmospheres, LHSV ranging from 0.1 to 15, and a recycle hydrogen to hydrocarbon ratio of about 1 to 10.

Reforming catalysts in current use are made substantially free of acidity, to reduce the tendency toward excessive cracking, leading to low liquid yields. Treating an acid catalyst with an alkali metal has been used effectively in eliminating acidity. I have now discovered that there is a criticality in the catalyst acidity for the large-pore zeolite in combination with a Group VIII metal which leads to good performance in reforming processes. This criticality is achieved by treating the catalyst during catalyst preparation with an effective amount of Group IA or Group IIA metal cations such that the molar ratio of aluminum in the zeolite framework to Group IA or Group IIA metal cations is between about 1.0 and 4.0.

Catalysts which are prepared such that this acid criticality is maintained have higher activity for reforming reactions. They can therefore be operated at lower temperatures and pressures, which results in longer catalyst cycle times and more stable catalyst operation. They are also more sulfur tolerant.

The lower catalyst temperatures have other consequences which are important for reforming reactions. Dealkylation reactions which remove the alkyl substituents from alkyl aromatics are reduced at lower reaction temperatures. Dehydrocyclization of paraffins, such as to form benzene from hexane, is also reduced. The consequence of reducing these reactions is that the amount of benzene produced by the process of this invention is reduced relative to the formation of the more desirable alkyl substituted aromatics.

Another benefit of the catalyst of this invention is its ability to increase the amount of isoparaffins, relative to normal paraffins, when compared with other reforming catalysts known in the art. In general, isoparaffins have higher octane than do the corresponding normal paraffin isomers. Octane number is determined using one of a number of methods, including the Research method (ASTM D-2699) and the Motor method (ASTM D-2700). With isoparaffins, such as isobutane, which are used as feedstocks for other hydrocarbon processing, the branched isomers are of much higher value than the normal paraffins, and are therefore preferred as constituents in the products from reforming reactions. Determining the isobutane/normal butane ratio in reforming products is a standard procedure using, for example, gas chromatographic techniques.

The catalyst of this invention, by reason of having a molar ratio of aluminum to Group IA or Group IIA metal cations between about 1.0 and 4.0, produces low amounts of methane and ethane when used in reforming operations. Thus, the high hydrogen consumption associated with methane and ethane production, which is characteristic of current reforming processes, is avoided in the process of this invention. Furthermore, the low amounts of methane and ethane formed during the process of this invention results in high purity hydrogen produced by the process in comparison to the current reforming processes.

EXAMPLES

Example 1

652 grams of a 40% aqueous solution of tetraethylammonium hydroxide was poured into a glass vessel with stirring. To this was added 375 ml of water, and then 41.71 grams of sodium aluminate trihydrate ($Na_2.Al_2O_3.3 H_2O$) with continued stirring. To this mixture was then added 1048 grams of Ludox AS-30 slowly with stirring. This mixture was then transferred to an autoclave and heated for 5 days at 150° C. The solid product was filtered, washed with water, dried at 120° C., and calcined at 538° C. The calcined beta catalyst was ion exchanged and recalcined to form H-beta as follows. 421.6 grams of Baker $NH_4NO_3$ was dissolved in deionized water to make 3 liters of solution. This solution was added to 263.3 grams of calcined beta catalyst, 2.26 liters of water added, and the mixture heated overnight at 100° C. Catalyst solids were separated from the liquid by filtering and then by centrifuging. The catalyst was washed 4 times with water, dried for 3 days at 120° C., and calcined for 4 hours at 204° C., then for 4 hours at 371° C., and then for 10 hours at 538° C. to make H-beta zeolite.

Example 2

A cesium-treated version of beta zeolite was prepared for use as a reforming catalyst. Solution A was prepared by mixing the following: 7.04 grams cesium chloride, 0.44 grams tetrammine platinum (II) chloride, 0.93 grams concentration ammonia solution, and 242 grams of an aqueous ammonium acetate solution (containing 7.7 grams ammonium acetate per liter of solution). 50 grams of Solution A was exchanged into 10 grams of H-beta from Example 1 by shaking for 48 hours in a sealed centrifuge bottle. The exchanged catalyst was then washed four times with deionized water, filtered and air dried. The dried catalyst was then heated for 16 hours at 121° C. and calcined at 288° C. for 2 hours in air. The calcined catalyst was reduced at 510° C. in 300 ml/min hydrogen for one hour and then sulfided for one 32 hour at 427° C. with a solution of dimethyldisulfide in hexane (containing 200 ppm sulfur) prior to testing. The catalyst of this example was labeled Catalyst I.

Example 3

A second beta zeolite, used as synthesized (and having roughly 10% of the exchange sites occupied by $Na^+$ ions), was calcining at 538° C. to remove the organic template. This second zeolite was prepared in its cesium-treated form for use as a reforming catalyst, using the following procedure. Solution B was prepared by mixing the following: 2.81 grams cesium chloride, 0.18 grams tetrammine platinum (II) chloride, 4.75 grams concentration ammonia solution, and 92.3 grams of an aqueous ammonium acetate solution (containing 38.5 grams ammonium acetate per liter of solution). 25 grams of Solution B was exchanged into 5 grams of beta zeolite by shaking for 3 days in a sealed centrifuge bottle using the method described in Example 2. The exchanged catalyst was then washed 7 times with 25 grams aliquots of deionized water until free of chloride ions, filtered and air dried. The dried catalyst was then further dried at 121° C., calcined, reduced, and sulfided in the same manner as described in Example 2. The catalyst of Example 3 was labeled Catalyst II.

Example 4

Reforming conditions used with these catalysts are listed in Table 1. The feed used in the reforming test was a mixture of purified isoheptanes with the composition shown below:

| | |
|---|---|
| n-Heptane | 10.8 wt. % |
| 2-Methylhexane | 20.7 wt. % |
| 3-Methylhexane | 20.8 wt. % |
| 2,3-Dimethylpentane | 8.5 wt. % |
| 3,3-Dimethylpentane | 0.7 wt. % |
| 1,1-Dimethylcyclopentane | 5.1 wt. % |
| cis 1,3-Dimethylcyclopentane | 9.2 wt. % |
| trans 1,3-Dimethylcyclopentane | 8.6 wt. % |
| trans 1,2-Dimethylcyclopentane | 12.2 wt. % |
| Methylcyclohexane | 2.9 wt. % |
| Cyclohexane | 0.7 wt. % |
| Ethylcyclopentane | 0.1 wt. % |
| Toluene | 0.5 wt. % |

In this performance test, Catalysts I and II were compared with Catalyst III, a non-zeolitic commercial reforming catalyst. Reaction conditions and results are shown in Table 1. It can be seen that the catalysts of this invention, when run at conditions selected to maintain essentially equivalent product Octane Number values, gave significantly improved product properties relative to that of the comparative catalyst. Furthermore, the catalysts of this invention could be operated at lower reactor temperature and pressure than those of the comparative catalyst.

TABLE 1

| Reforming Isoheptane Mixture | | | |
|---|---|---|---|
| | Catalyst | | |
| | I | II | III |
| Reaction Conditions | | | |
| Temperature, °C. | 371 | 371 | 482 |
| Pressure, psig | 50 | 50 | 200 |
| WHSV | 12 | 12 | 6 |
| H₂/Hydrocarbon (mole ratio) | 6.4 | 6.4 | 6.4 |
| Catalyst | | | |
| Platinum, wt. % | 0.40 | 0.40 | 0.30 |
| Cesium, wt. % | 6.30 | 6.10 | 0.0 |
| Product Properties | | | |
| Total Conversion, % | 49.2 | 44.9 | 53.2 |
| Methane Concentration, wt. % | 0.02 | 0.01 | 0.84 |
| Benzene Concentration, wt. % | 0.49 | 0.54 | 1.28 |
| Butane Concentration, wt. % | 4.54 | 4.23 | 2.59 |
| Iso-butane/n-butane ratio | 7.90 | 7.77 | 1.07 |
| Research Octane Number (calc) | 80.2 | 78.7 | 80.1 |
| Yield, wt. % | 90.3 | 90.9 | 92.0 |
| Aromatization Selectivity, %* | 63.3 | 64.7 | 62.3 |

*Arom. Sel. = 100×(% Aromatics in Product/% Total Conversion)

FIG. 1 shows the range of cesium loading on platinum beta zeolites which give the good aromatization selectivity, for the particular feed shown in Example 4. The optimal range of cesium loading on platinum beta zeolite will vary depending on the feed. The aromatization selectivity is defined as 100× (% aromatics in product ÷ % total conversion). The data included in Table 2 support this figure.

TABLE 2

Effect of Cs Addition on the Performance of Sulfided Pt/Cs-beta Reforming Catalysts at 800° F., 200 PSIG, 6 WHSV

|  | Commercial Catalyst | 2 Pt/6.1% Cs-beta | 3 Pt/6.23% Cs-beta | 4 Pt/7.96% Cs-beta | 5 Pt/9.38% Cs-beta | 6 Pt/9.01% Cs-beta | 7 Pt/11.5% Cs-beta |
|---|---|---|---|---|---|---|---|
| Temperature, °F. | 800.00 | 800.00 | 800.00 | 800.00 | 800.00 | 800.00 | 800.00 |
| Pressure, PSIG | 200.00 | 200.00 | 200.00 | 200.00 | 200.00 | 200.00 | 200.00 |
| WHSV | 6.00 | 6.00 | 6.00 | 6.00 | 6.00 | 6.00 | 6.00 |
| H$_2$:HC Molar Ratio | 6.40 | 6.40 | 6.40 | 6.40 | 6.40 | 6.40 | 6.40 |
| Al/Cs Molar Ratio |  | 2.60 | 2.40 | 1.83 | 1.53 | 1.56 | 1.22 |
| Cyclo-C$_5$ Conv. % | 39.80 | 97.90 | 97.10 | 90.80 | 61.40 | 61.70 | 15.80 |
| Methylhexane Conv. % | 1.20 | 99.60 | 99.40 | 34.80 | 8.90 | 9.00 | 0.80 |
| Total Feed Conv. % | 26.60 | 98.40 | 97.70 | 53.20 | 34.00 | 34.00 | 10.40 |
| Arom. Selectivity | 40.00 | 21.00 | 24.00 | 56.00 | 64.00 | 64.00 | 44.00 |
| Product Analysis |  |  |  |  |  |  |  |
| Methane, wt. % | 0.22 | 0.21 | 0.09 | 0.10 | 0.07 | 0.05 | 0.00 |
| Butanes, wt. % | 0.28 | 39.90 | 38.70 | 7.20 | 0.90 | 0.90 | 0.02 |
| Benzene, wt. % | 0.69 | 2.04 | 1.84 | 0.57 | 0.62 | 0.61 | 0.62 |
| Toluene, wt. % | 9.01 | 12.80 | 16.00 | 28.60 | 18.60 | 18.80 | 3.21 |
| Butanes, i/n | 0.60 | 3.10 | 3.30 | 3.50 | 2.00 | 2.10 | 0.60 |
| C$_5$ + Yield, wt. % | 98.70 | 29.90 | 32.70 | 85.60 | 97.20 | 97.30 | 99.80 |
| RON (Calc) | 68.00 | 100.20 | 100.50 | 80.30 | 72.60 | 72.60 | 65.00 |

Note:
Arom. Selectivity = wt. % total arom./total feed conversion.

What is claimed is:

1. A catalytic reforming process which comprises contacting a hydrocarbonaceous feedstock under catalytic reforming conditions with a composition comprising a large-pore zeolite having a pore size greater than 6 and less than 8 angstroms, a Group VIII metal component, and a Group IA or Group IIA metal cation wherein the molar ratio of framework aluminum to Group IA or Group IIA metal cations is between about 1.0 and 2.2.

2. The process in accordance with claim 1 wherein the large-pore zeolite contains a binder.

3. The process in accordance with claim 1 wherein the large-pore zeolite contains a silica-based or alumina-based binder.

4. The process in accordance with claim 1 wherein the Group VIII metal in the catalyst composition is platinum.

5. The process in accordance with claim 1 wherein the large-pore zeolite is SSZ-26, mordenite, ZSM-12, SSZ-33, SSZ-24, Beta Zeolite, or SSZ-31.

6. The process in accordance with claim 1 wherein the large-pore zeolite is Beta Zeolite.

7. The process in accordance with claim 1 wherein the Group VIII metal component is between about 0.1 and 2.0 wt. percent.

8. The process in accordance with claim 7 wherein the Group VIII metal component is platinum.

9. The process in accordance with claim 1 wherein the Group IA cation is cesium, lithium, potassium, or sodium.

10. The process in accordance with claim 1 wherein the Group IIA cation is barium, calcium, magnesium or strontium.

11. A catalytic reforming process which comprises contacting a hydrocarbonaceous feedstock under catalytic reforming conditions with a composition comprising Beta Zeolite, platinum and cesium wherein the molar ratio of aluminum to cesium is between about 1.0 and 2.2.

12. A catalytic reforming process which comprises contacting a hydrocarbonaceous feedstock under catalytic reforming conditions with a composition comprising SSZ-26 zeolite, platinum and cesium wherein the molar ratio of aluminum to cesium is between about 1.0 and 2.2.

13. A catalytic reforming process which comprises contacting a hydrocarbonaceous feedstock under catalytic reforming conditions with a composition comprising ZSM-12 zeolite, platinum and cesium wherein the molar ratio of aluminum to cesium is between about 1.0 and 2.2.

14. A catalytic reforming process which comprises contacting a hydrocarbonaceous feedstock under catalytic reforming conditions with a composition comprising mordenite, platinum and cesium wherein the molar ratio of aluminum to cesium is between about 1.0 and 2.2.

15. A catalytic reforming process which comprises contacting a hydrocarbonaceous feedstock under catalytic reforming conditions with a composition comprising SSZ-31 zeolite, platinum and cesium wherein the molar ratio of aluminum to cesium is between about 1.0 and 2.2.

16. A catalytic reforming process which comprises contacting a hydrocarbonaceous feedstock under catalytic reforming conditions with a composition comprising SSZ-33 zeolite, platinum and cesium wherein the molar ratio of aluminum to cesium is between about 1.0 and 2.2.

17. A catalytic reforming process which comprises contacting a hydrocarbonaceous feedstock under catalytic reforming conditions with a composition comprising SSZ-24 zeolite, platinum and cesium wherein the molar ratio of aluminum to cesium is between about 1.0 and 2.2.

18. The process in accordance with claim 1 wherein the reforming reaction occurs in the presence of added hydrogen.

19. The process in accordance with claim 1 wherein said reforming conditions comprise a temperature within the range of about 371° C. to about 593° C.; a total pressure within the range of about 50 to about 300 pounds per square inch gauge; a liquid hourly space velocity ranging from about 2 to about 24; and about 2 to about 10 moles of hydrogen per mole of hydrocarbon entering the reforming zone.

20. A catalytic reforming process which comprises contacting a hydrocarbonaceous feedstock under catalytic reforming conditions with a composition comprising Beta Zeolite, platinum and barium wherein the molar ratio of aluminum to barium is between about 1.0 and 2.2.

21. A catalytic reforming process which comprises contacting a hydrocarbonaceous feedstock under catalytic reforming conditions with a composition comprising SSZ-26 zeolite, platinum and barium wherein the molar ratio of aluminum to barium is between about 1.0 and 2.2.

22. A catalytic reforming process which comprises contacting a hydrocarbonaceous feedstock under catalytic reforming conditions with a composition comprising ZSM-12 zeolite, platinum and barium wherein the molar ratio of aluminum to barium is between about 1.0 and 2.2.

23. A catalytic reforming process which comprises contacting a hydrocarbonaceous feedstock under catalytic reforming conditions with a composition comprising mordenite, platinum and barium wherein the molar ratio of aluminum to barium is between about 1.0 and 2.2.

24. A catalytic reforming process which comprises contacting a hydrocarbonaceous feedstock under catalytic reforming conditions with a composition comprising SSZ-31 zeolite, platinum and barium wherein the molar ratio of aluminum to barium is between about 1.0 and 2.2.

25. A catalytic reforming process which comprises contacting a hydrocarbonaceous feedstock under catalytic reforming conditions with a composition comprising SSZ-33 zeolite, platinum and barium wherein the molar ratio of aluminum to barium is between about 1.0 and 2.2.

26. A catalytic reforming process which comprises contacting a hydrocarbonaceous feedstock under catalytic reforming conditions with a composition comprising SSZ-24 zeolite, platinum and barium wherein the molar ratio of aluminum to barium is between about 1.0 and 2.2.

* * * * *